US006347260B1

(12) United States Patent
Graushar et al.

(10) Patent No.: US 6,347,260 B1
(45) **Date of Patent: *Feb. 12, 2002**

(54) MULTI-MAILER

(75) Inventors: William T. Graushar, Wauwatosa; Thomas A. Quadracci, Brookfield, both of WI (US)

(73) Assignee: Quad/Graphics, Inc., Sussex, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/679,745

(22) Filed: Oct. 5, 2000

Related U.S. Application Data

(63) Continuation of application No. 09/178,132, filed on Oct. 23, 1998, now Pat. No. 6,167,326.

(51) Int. Cl.[7] .................................................. G06F 7/00

(52) U.S. Cl. ....................... 700/223; 700/200; 700/219; 270/1.02; 270/52.03

(58) Field of Search ................................ 700/220, 219, 700/221, 226, 227, 223, 224; 270/1.02, 1.03, 52.03, 52.16, 58.29

(56) References Cited

U.S. PATENT DOCUMENTS 4,789,147 A 12/1988 Berger et al.
5,114,128 A 5/1992 Harris, Jr. et al.
5,143,362 A * 9/1992 Doane et al. ................ 270/1.1
5,177,687 A * 1/1993 Baggarly et al. ...... 364/464.03
5,276,628 A 1/1994 Schneiderhan
5,317,654 A * 5/1994 Perry et al. .................... 382/61
5,377,120 A 12/1994 Humes et al.
5,547,175 A * 8/1996 Graushar et al. ............. 270/37
5,798,930 A * 8/1998 Van Oosten ........... 364/478.01
5,818,724 A 10/1998 Brewster, Jr. et al.
6,167,326 A * 12/2000 Graushar et al. ........... 700/223

* cited by examiner

*Primary Examiner*—Christopher P. Ellis
*Assistant Examiner*—Khoi H. Tran
(74) *Attorney, Agent, or Firm*—Michael Best & Friedrich LLP

(57) ABSTRACT

A method for combining in zip code order pre-personalized printed items with items that are not pre-personalized. The method includes the step of producing a grouping of the pre-personalized items in zip code order according to a first mailing list. The first mailing list is merged with a second mailing list associated with the items that are not pre-personalized to produce a master mailing list of a desired zip code order. The pre-personalized items and the items that are not pre-personalized are selectively fed to a conveyor in the desired zip code order. The items that are not pre-addressed are addressed and the zip code bundles are prepared according to the master mailing list.

14 Claims, 2 Drawing Sheets

MULTI-MAILER

RELATED APPLICATION

This application is a continuation of U.S. patent application Ser. No. 09/178,132, filed Oct. 23, 1998, now U.S. Pat. No. 6,167,326.

FIELD OF THE INVENTION

The present invention relates generally to an apparatus and method for combining pre-personalized items (such as third class publications) with items not pre-personalized (such as second class publications) to produce a plurality of zip code bundles.

BACKGROUND OF THE INVENTION

Many processes are performed in conjunction with the finishing and distribution of publications or books such as catalogs and magazines after they have been printed. These are referred to as post-press or in-line processes. Typical in-line processes include assembly of signatures; binding; trimming; insertion of additional materials; personalization, including ink jetting of addresses and other information; and bundling.

Catalogs and magazines are typically mailed to their recipients via the postal service. Postal service rates are dependent on various factors. One factor is the type of publication, based on content, that is being mailed. For example, second class publications are defined as printed matter including editorial content, while third class publications are those including only advertising material, such as catalogs and promotional flyers.

Postal rate discounts can be obtained for bundles of publications wherein each publication in the bundle is addressed to the same zip code, or to a specific mail route within a zip code. One way to achieve the proper assembly of zip code bundles of a single publication is to produce the books in zip code order, label appropriate ones of the books with a mark indicative of the end of the bundle (based on data from a mailing list), and convey the books past a detector which indicates to a bundling machine when the mark occurs. However, it is also desirable to combine publications having different titles into a single mail stream and produce zip code bundles from that stream in order to produce bundles containing a sufficiently large number of publications to take optimal advantage of mailing discounts.

Currently, various multi-mailer systems are known which operate to combine different titles of previously bound publications into a single mail stream. The different publications are selectively fed according to a master mailing list produced by combining the mailing lists of the individual publications. These systems are currently used for co-mailing publications that are not pre-personalized.

For third class publications such as catalogs, it is especially advantageous to personalize the catalog to include the intended recipient's name and perhaps customer number on the inside of the catalog, for example, on an order form. Current postal regulations require that an accurate count of third class publications be made to determine the applicable postal fee.

SUMMARY OF THE INVENTION

It is an object of the present invention to produce zip code bundles from a plurality of book groupings which include both books which have been pre-personalized and produced in zip code order and books which have not been pre-personalized.

In one aspect, the invention provides a method for combining, in zip code order, pre-personalized printed items with printed items that are not pre-personalized. The method includes the step of producing a grouping of pre-personalized printed items in a first prearranged order according to a first mailing list. The first mailing list is combined with a second mailing list associated with the printed items that are not pre-personalized to produce a master mailing list of a desired zip code order. The pre-personalized printed items from the grouping of pre-personalized printed items and the printed items that are not pre-personalized are selectively fed in the desired zip code order. The printed items that are not pre-personalized are addressed, zip code bundles are prepared according to the master mailing list.

In another aspect, the invention provides a method for combining in zip code order pre-addressed printed items with items that are not pre-addressed. The method includes the step of producing a grouping of the pre-addressed items in zip code order according to a first mailing list. The first mailing list is merged with a second mailing list associated with the items that are not pre-addressed to produce a master mailing list of a desired zip code order. The pre-addressed items and the items that are not pre-addressed are selectively fed to a conveyor according to the master mailing list. The items that are not pre-addressed are addressed and the zip code bundles are prepared according to the master mailing list.

Figure 1:
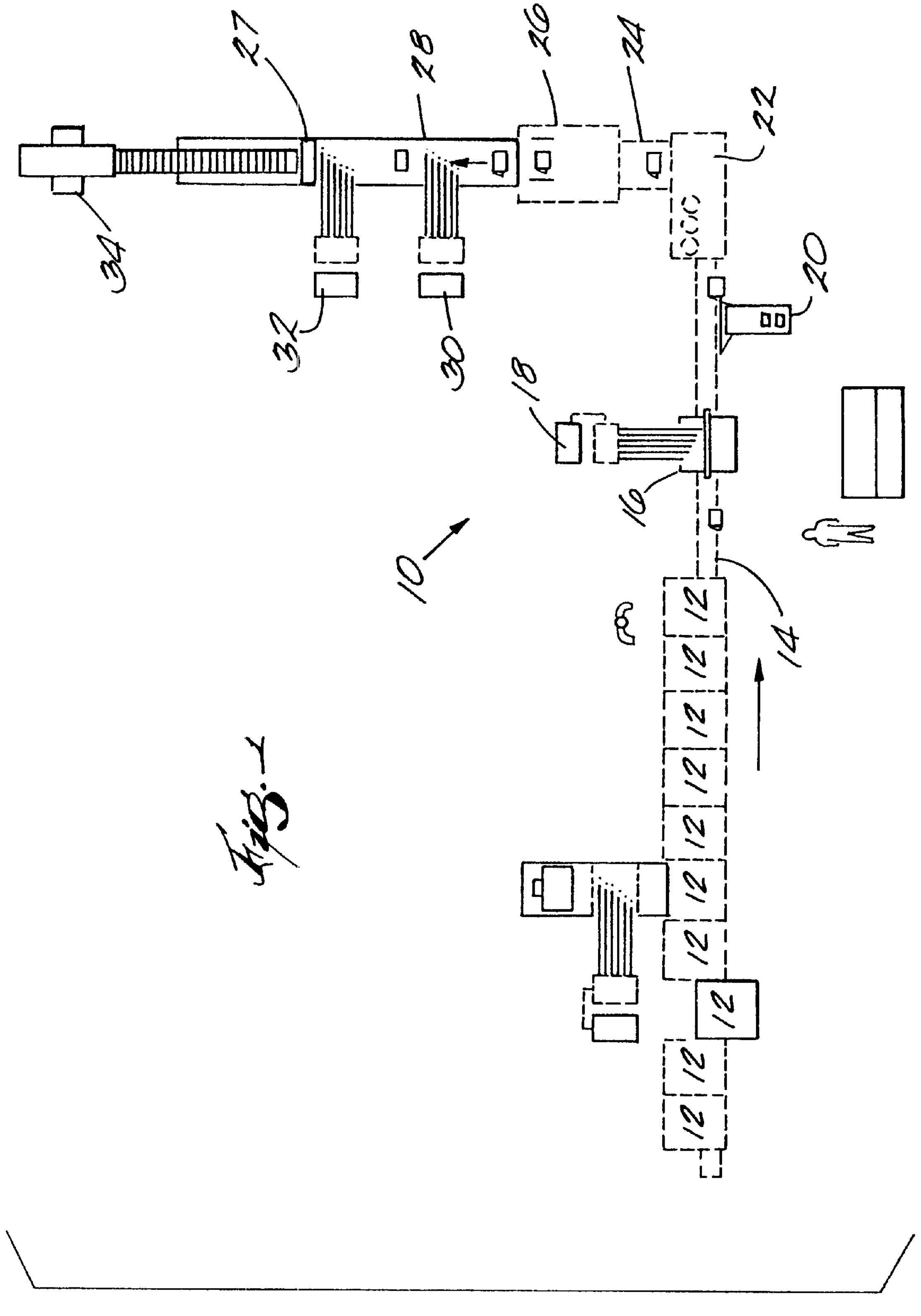
FIG. 1 is an illustration of a typical binding line for producing an ordered grouping of pre-personalized books.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

Illustrated in FIG. 1 is a typical binding line for producing a grouping of third class books which are personalized and produced in zip code order. A plurality of pocket feeders 12 operate to selectively feed associated signatures (i.e., a portion of a book) to a conveyor line 14 to assemble different demographic versions of a single publication. A stream of books including different book versions is produced in a prearranged order, for example, in zip code order, according to a first mailing list for that publication.

The stream of books is fed to a saddle print stand 16. The saddle print stand 16 includes an ink jet printer 18 that prints enhancements to the title of the publication and/or other information on the spine of each book. Optionally, a card-feeder 20 selectively inserts various cards into each book. Each book is stitched and then trimmed at respective stations 22 and 24.

After trimming, an inspection system 26 inspects each book (for example, by measuring its squareness) to detect unacceptable books. An unacceptable book is rejected and a generic book is fed at location 27 to fill the slot of any previously rejected book, so as to maintain the zip code order of the demographically produced books.

Each book is next directed to a mailtable 28. Plow devices on the mailtable are operable to open each book so that an ink jet printer 30 can print on an inside page of the book. For example, personalization such as the name, address and customer number or other relevant information corresponding to the intended recipient can be printed on the order form of a book. Each book is then directed to an additional ink jet printer 32 which can provide additional personalization on an outside page of the book. For example, the name and/or address of the intended recipient can be printed on the outside of the book. As mentioned, the books are produced in zip code order, and this order is maintained by sequentially feeding the books to a wound roll 34, or other device which maintains custody of the books in the prearranged order.

Figure 2:
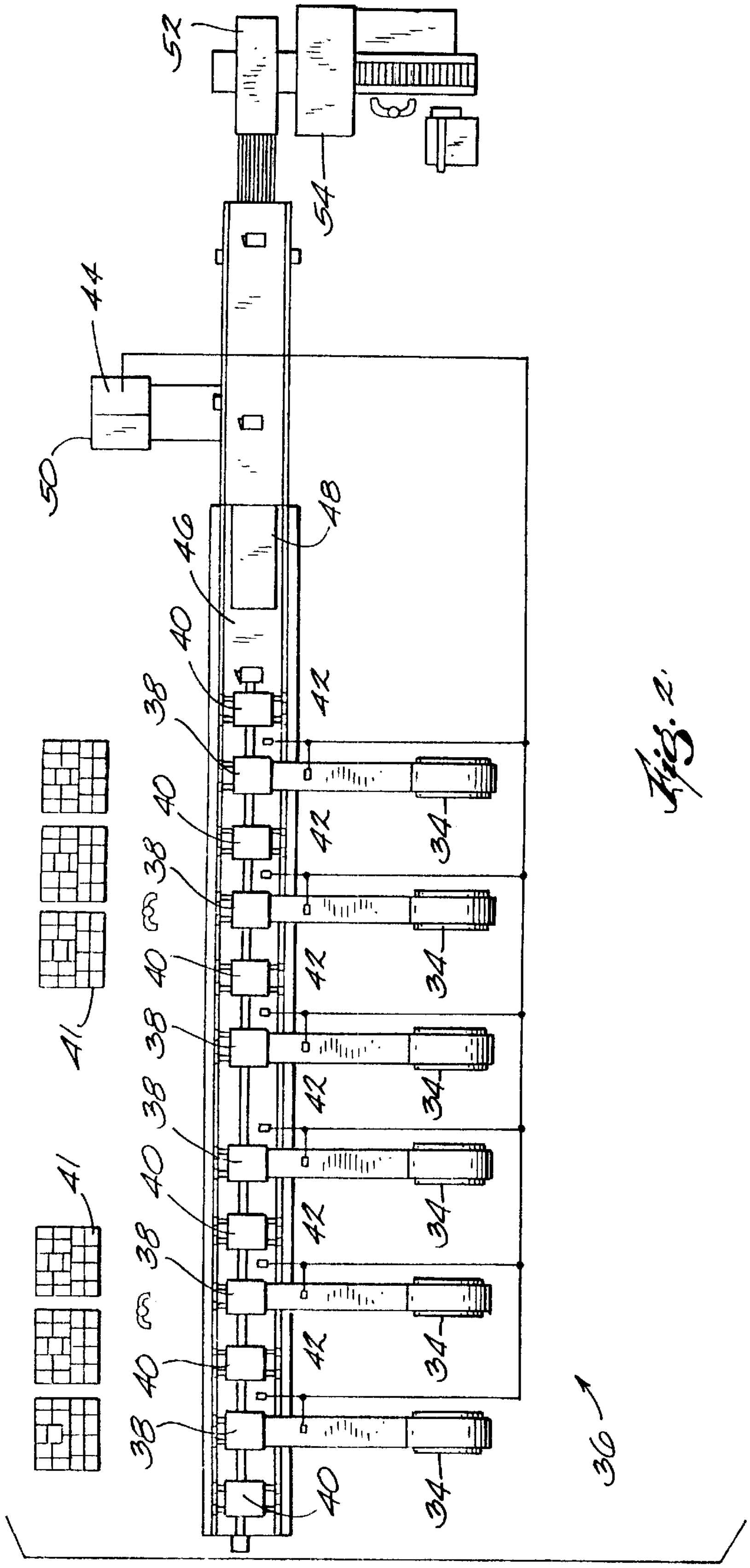
FIG. 2 is an illustration of a finishing or gathering line for producing zip code bundles from separate groupings of pre-personalized books and books that are not pre-personalized.

A finishing or gathering line 36 is illustrated in FIG. 2. The purpose of the distribution line 36 is to combine groupings of pre-personalized books produced, for example, in the manner described above and illustrated in FIG. 1, with streams of books which are not pre-personalized, to achieve zip code bundles. In particular, the distribution line 36 includes a plurality of feeder sections 38, 40. Some of the feeder sections 38 are connected to wound rolls 34 which include pre-personalized books produced and maintained in zip code order. The other feeder sections 40 include books 41 such as second class publications which are not pre-personalized. Books 41 are then delivered to feeder sections 40.

The mailing lists associated with the different publications in the feeder sections are merged to create one file or master mailing list which includes the desired zip code mailing sequence of all the books. The master mailing list is maintained in a controller 44.

Associated with each wound roll feeder section is an optical character detector 42 which operates to read printed characters on each book on the wound roll in order to verify that the books on the wound roll are in the correct zip code sequence according to the individual mailing list associated with that publication. Such a verification system is known in the art.

The feeder sections 38, 40 are selectively actuated by the controller 44 operating under the influence of the master mailing list. The feeder sections 28, 40 selectively feed books onto a conveyor 46 in the desired zip code order. A vision system 48 situated near the end of the conveyor 46 operates to verify the title of each book to ensure the books are in the correct zip code order according to the master mailing list. Such a vision system is also known in the art.

An ink jet printer 50 downstream of the vision system also operates under the control of the controller 44. The ink jet printer 50 prints addresses on those books which are not pre-addressed. The ink jet printer can also provide any other additional personalization desired. The books are then directed to a stacker 52 and strapper 54 apparatus which operate under the control of the controller 44 to produce the desired zip code bundles.

Various features and advantages of the invention are set forth in the following claims.

What is claimed is:

1. A method for combining printed items of a first mailing list with printed items of a second mailing, said method comprising:

producing a first mailing list of pre-personalized printed items;

producing a second mailing list of printed items;

combining the first mailing list with the second mailing list to produce a master mailing list in a desired zip code order;

selectively feeding the printed items from the first and second mailing lists in the order they appear on the master mailing list; and addressing any of the pre-personalized printed items or printed items that have not been addressed.

2. The method as set forth in claim 1 wherein the pre-personalized printed items on the first mailing list are third class publications.

3. The method as set forth in claim 1 wherein the printed items on the second mailing list are second class publications.

4. The method as set forth in claim 1 wherein the printed items on the second mailing list are not pre-personalized.

5. The method as set forth in claim 1 wherein the pre-personalized items on the first mailing list include personalization in the form of at least one of recipient information on an outside page, recipient information on an inside page, recipient address information, and selective or demographic production.

6. The method as set forth in claim 1 wherein the printed items of the first mailing list are of one postal class of publications and the printed items of the second mailing list are of a different class of postal publications.

7. The method as set forth in claim 1 wherein the printed items of the first and second mailing lists are of the same postal class of publications.

8. The method as set forth in claim 1 and further including the act of preparing zip code bundles according to the master mailing list.

9. The method as set forth in claim 1 and further including the act of reading optical characters on the pre-personalized printed items to verify the printed items are in the proper sequence according to the first mailing list.

10. A method for combining printed items of a first mailing list with printed items of a second mailing, said method comprising:

producing a first mailing list of printed items of one class of postal publications;

producing a second mailing list of printed items of a different class of postal publications;

combining the first and second mailing lists to produce a master mailing list in a desired zip code order; and selectively feeding the printed items from the first and second mailing lists in the order they appear on the master mailing list to produce a stream of combined printed items in desired zip code order.

11. The method of claim 10 wherein the first mailing list of printed items includes second class postal publications and the second mailing list of printed items includes third class postal publications.

12. The method of claim 10 wherein the printed items on at least one of the first and second mailing list are pre-personalized.

13. The method of claim 12 wherein pre-personalization includes at least one of recipient information on an outside page, recipient information on an inside page, recipient address information, and selective or demographic production.

14. The method of claim 10 and further including the act of reading optical characters on at least some of the printed items to verify the printed items are in the proper sequence according to the respective mailing list.

* * * * *